March 6, 1934.   C. A. BULKELEY   1,949,735
APPARATUS FOR VENTILATING AND CONDITIONING BUILDINGS
Filed March 31, 1931    2 Sheets-Sheet 1
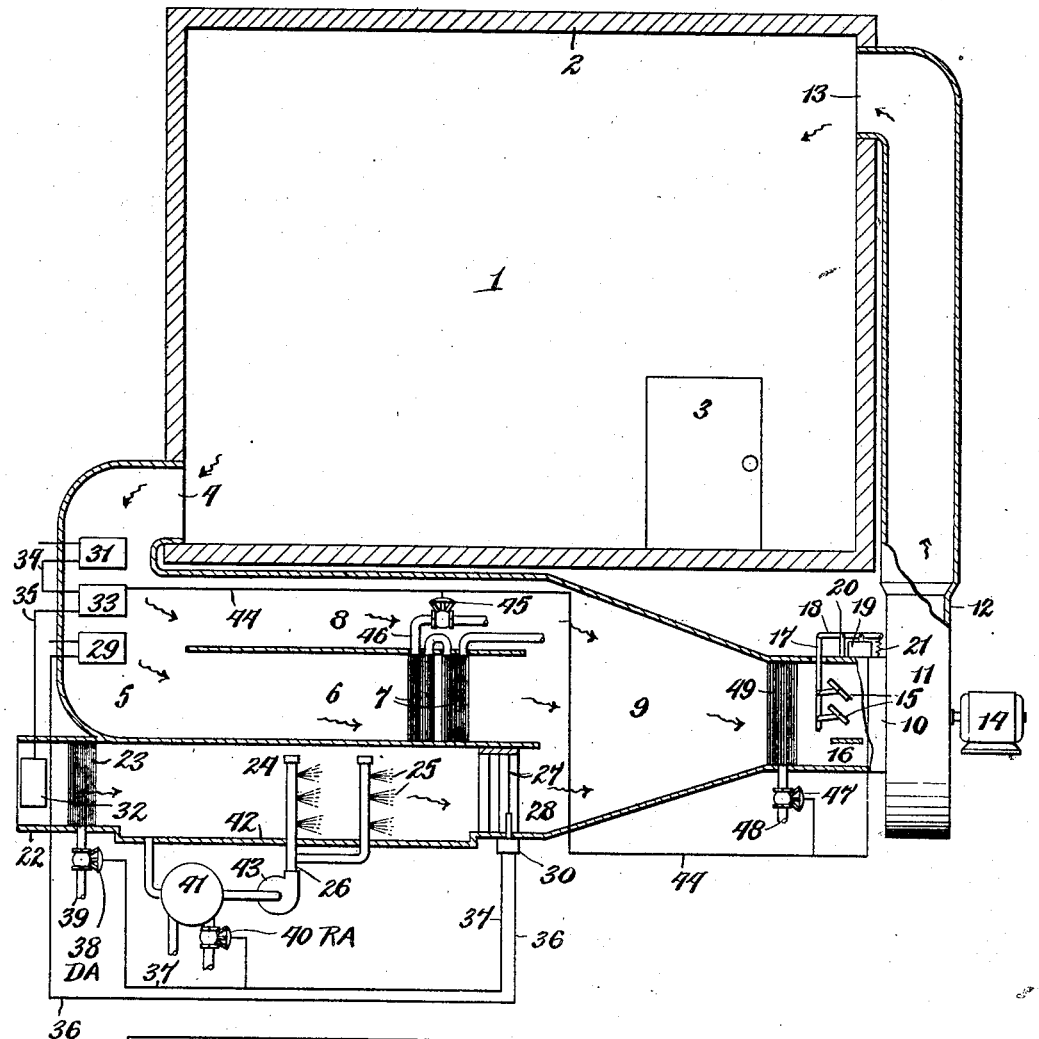
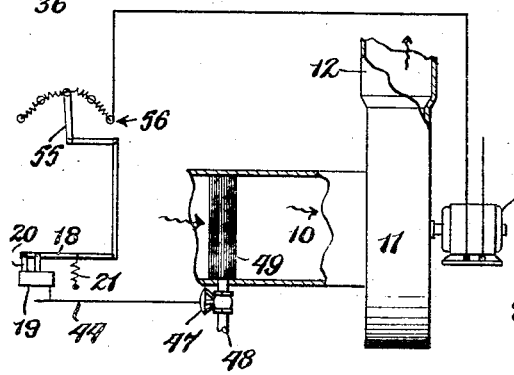
Inventor
Claude A. Bulkeley
By Pozzi and Powers
Attorneys March 6, 1934.   C. A. BULKELEY   1,949,735
APPARATUS FOR VENTILATING AND CONDITIONING BUILDINGS
Filed March 31, 1931   2 Sheets-Sheet 2
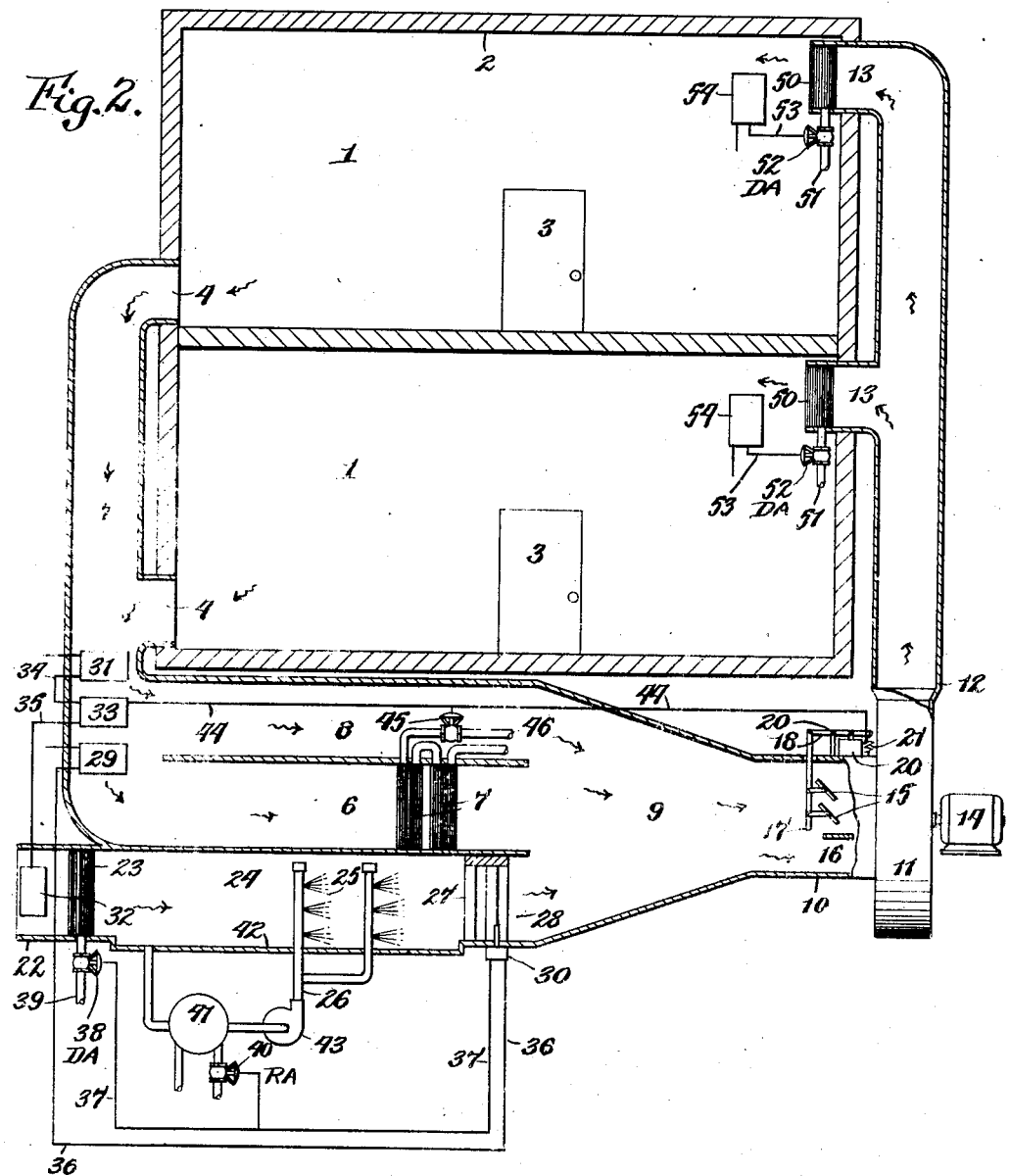
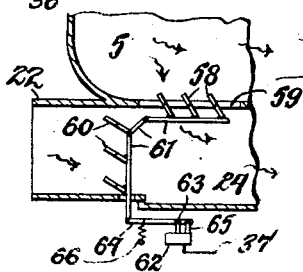
Inventor
Claude A. Bulkeley
By Popp and Powers
Attorneys Patented Mar. 6, 1934

1,949,735

UNITED STATES PATENT OFFICE 1,949,735

APPARATUS FOR VENTILATING AND CONDITIONING BUILDINGS

Claude A. Bulkeley, Buffalo, N. Y., assignor to Niagara Blower Company, Buffalo, N. Y., a corporation of New York Application March 31, 1931, Serial No. 526,647

7 Claims. (Cl. 257—8)

This invention relates to apparatus for cooling, ventilating and maintaining a predetermined relative humidity of buildings or enclosures such as office buildings, factories requiring special conditions for particular processes or for the comfort of the occupants and for domestic use.

In the ventilation and conditioning of air in buildings, the comfort of the occupants depends not only on the condition of the air itself but also on the movement of the air through the building. Thus, regardless of the heating, cooling or conditioning as to humidity effected, it is desirable to have a large volume of air circulated through the building. It is also desirable that the temperature of the air inside the building bear a definite ratio to the temperature of the outside air, within, of course, the range of human comfort. Thus it is desirable that the temperature of the air inside the building bear a definite ratio to the temperature of the outside air so that discomfort is not experienced in passing in and out of the building. Thus it is desirable in the summer time to maintain a temperature in the building of approximately ten degrees below the outside temperature. If the temperature inside the building is more than ten degrees below the outside temperature, the people coming in experience a chill which not only renders them uncomfortable at the time of entering but may continue throughout their stay. Furthermore, a very oppressive feeling occurs on passing to the outside if the differential is too great.

The conditions of the air in the building are also subject to fluctuation. In the winter time fresh air must, of course, be provided for ventilation, and must be heated, this being, however, only a small part of the air which must be circulated to insure a movement of air sufficient to insure the comfort of the occupants. In summer time fresh air must also be provided for ventilation and this air cooled to maintain the desired ratio between inside and outside temperatures. At the same time it is desirable not to circulate cooled fresh air exclusively through the building because such a large amount of fresh air is not necessary for ventilation and the dehumidification of the entire volume of air necessary to secure the desired air movement would require an unnecessary amount of refrigeration. The air conditions in the room are subject to constantly varying conditions such as the number of people in the room generating heat, the infiltration of heat in the summer, the loss of heat through the walls of the building in winter, the heat generated by the lights and other variables and to counteract these variables it is necessary to provide means for supplying air, a part of which is fresh air and all of which is of such controlled temperature as to maintain the desired ratio of inside and outside temperatures and thereafter a constant inside temperature and at all temperatures to maintain a desired relative humidity in the building.

It is one of the objects of this invention to provide apparatus for circulating air through an enclosure in which in both winter and summer a proper amount of fresh air is admitted to the enclosure in accordance with the heat load in the enclosure, and by which a sufficient amount of air is moved through the enclosure to insure the comfort of the occupants and in which the air discharged into the room is maintained at such temperature and humidity as to insure the maintenance of the desired temperature and humidity of the air in the room, regardless of the number of occupants or other variable influences, and during the summer time bearing a ratio to the fluctuating outside air temperatures.

Another object is to provide such a system in which the fresh air is always thoroughly washed and cleaned before being admitted to the room.

Another object is to provide such a system in which the larger proportion of the air handled by the system is air withdrawn from the room, cooled, if necessary, and returned with a smaller proportion of dehumidified fresh air to the room. In dehumidification, it is desirable to reduce the temperature of the air below its dew point to precipitate its excess water and since such dehumidification is applied only to the smaller part of fresh air handled and since the recirculated air is very close to the temperature and humidity desired, there is not only a saving in refrigeration through the reduction of the amount of air passed through the dehumidifier, but the heat of the recirculated air is also employed to restore the cold saturated air from the conditioner to the desired temperature and humidity.

Another object is to provide a control which functions solely through thermostat controls, thermostats being less delicate than hygrostats and more accurate, and to provide such a thermostat control which will accurately control the amount of recirculated and fresh air employed and the cooling and heating means to maintain exactly the conditions desired in the room and the temperature ratio with the outside air with a minimum expenditure of power required to both refrigerate and heat the air.

Another aim is to provide such a system in which the amount of fresh air drawn in is always proportional to the amount of recirculated air withdrawn from the room and in which the controlled cooling of the air is effected by cooling the relatively warm withdrawn room air and the heating required effected by heating the colder mixture of recirculated and dehumidified fresh air.

Other objects are to provide such a system which is compact, is inexpensive to install and maintain and which is conveniently accessible for repairs and adjustments.

In the accompanying drawings:

Figure 1 is a diagrammatic sectional elevation of a building equipped with a ventilating system embodying the present invention and showing diagrammatically the arrangement and action of all of the instrumentalities used to carry out the invention.

Figure 2 is a similar view showing a multiplicity of rooms being ventilated.

Figure 3 is a similar fragmentary view showing a modified form of the invention in which the control of the volume of air handled is obtained by a rheostat and a variable speed motor driving the main fan.

Figure 4 is a similar fragmentary view showing a modified form of the invention in which the tempering of the fresh air admitted to the conditioner is effected by admixture with warm recirculated air instead of by a tempering heater as shown in the other views.

In its general organization, this invention comprises means for drawing in fresh air, dehumidifying it and mixing it with a larger proportional quantity of recirculated air and means for delivering the mixed air in varying quantities to the room to be conditioned, the proportions of fresh and recirculated air in the mixture, at all times, however being the same. A part of the recirculated air is passed through cooling coils, and the amount of mixed air delivered to the room and its heating, when required, being also regulated in response to the differential between the inside and outside temperatures. Means are also provided for controlling the dehumidification of the fresh air through the differential in temperature of the room air and the temperature of the saturated cold air leaving the conditioner so as to control the relative humidity in the room.

The system is shown in connection with a room 1 of a building 2, this room having a door 3 through which air can escape so that an excess pressure is not built up in the room by the constant admission of fresh air. The various rooms 1 of the building are each provided with an air outlet 4 leading to a common duct 5 which communicates with the inlet of a cooling chamber 6 having a plurality of cooling coils 7 through which the recirculated room air passes and is cooled when a cooling medium is flowing through the coils 7.

Only a part of the recirculated room air passes through the cooling chamber 6 and cooling coils 7, the balance passing through a by-pass duct 8. The resistance of the by-pass duct 8 to the air flow is preferably equal to the resistance of the cooling coil 7 and the cooling chamber 6 so that at all times equal quantities of recirculated room air pass through the cooling coils 7 and the by-pass duct 8. The outlets of both the recirculated air cooling chamber 6 and the recirculated air by-pass duct 8 open into a mixing chamber 9 from which the air is withdrawn into the inlet 10 of a fan or blower 11, the outlet duct 12 of this fan being connected to the fresh air inlets 13 of the room or rooms 1.

The fan 11 in the form shown in Figs. 1 and 2 is driven by a motor 14 which may be of a constant speed type. An important feature of the present invention is the admission of variable quantities of air from the mixing chamber 9 to the room or rooms 1. This is effected by providing dampers 15 in the fan inlet 10, a by-pass 16 being provided around these dampers 15 so that at all times a minimum amount of air is delivered to the room or rooms 1. The several dampers 15 are linked together by a bar 17, this bar being moved to open and close the dampers 15 by the operating arm 18 of an air motor 19. The operating arm 18 of the motor 19 is pivoted to a stationary support as at 20 between the motor 19 and the link 17 and a spring 21 also tends to raise the outer end of the operating arm 18 and the link 17 and hold the dampers 15 open. When air pressure is introduced into the motor 19, the operating arm 18 and link 17 are moved in the opposite direction and the dampers 15 are moved from open to closed position. It is therefore apparent that the motor 19 and dampers 15 provide for the regulation of the amount of air delivered to the room or rooms 1 by increasing or decreasing the resistance to the flow of air through the fan inlet 10.

The fresh air is drawn in from the outside through a fresh air inlet duct 22 and, in the form shown in Figs. 1 and 2, passes through heating coils 23, these heating coils tempering the cold air in winter time before it passes through a conditioner 24. In this container 24 the fresh air passes through sprays 25 of refrigerated water, the refrigerated water being supplied through an inlet pipe 26 and the spent spray water being withdrawn from the bottom of the conditioner in any usual and well known manner. The air in passing through the conditioner is lowered to a predetermined temperature which in the summer time is generally below the dew point of the fresh air so that in passing through the conditioner, water is removed from the fresh air. This dehumidified fresh air then passes through eliminator plates 27 which are shaped to whip the air back and forth and remove any entrained water therein and passes through an outlet duct 28 to the mixing chamber 9. This dehumidified fresh air leaves the conditioner 24 saturated at a lowered temperature and in the mixing chamber 9 mixes with the warm recirculated air and is forced into the room or rooms 1 by the fan 14, the amount of such mixed air being delivered being determined by the setting of the dampers 15, although the mixed air under all conditions of operation has constant proportions of fresh and recirculated air.

In the form of the invention shown in Fig. 1, the temperature of the air in the room 1 and its relative humidity are controlled by five thermostats 29, 30, 31, 32 and 33. All of these thermostats are supplied with air under pressure from any suitable source (not shown) and are of the direct acting intermediate types, that is, with a constant air pressure supply of, say, 15 pounds supplied at the inlet of each thermostat, the air pressure on the outlet of the thermostat rises with rising temperature of the air in which the sensitive parts of the thermostat are located.

Conversely with falling air temperature, the air pressure on the outlet of each thermostat falls. It follows that when an intermediate desired temperature is to be maintained by the thermostat that an intermediate outlet pressure is also maintained by each thermostat.

The thermostats 29 and 32 are master thermostats, and the thermostats 30 and 33 are sub-thermostats. A master thermostat has a comparatively wide range of temperature change and corresponding outlet pressure change, often having a range of temperature change of 20° F. to cause an outlet pressure change of 0 to 15 pounds. Such a master thermostat can be made by adjustment to cover different limited ranges, for example, from 75° to 95° F. or from 60° to 80° F. The master thermostats herein used are employed to vary the setting of the corresponding sub-thermostat. For example, as the temperature to which the master thermostat is exposed varies, say, from 95° to 85° F. the outlet air pressure will vary from, say, 15 to 7.5 pounds, which change in air pressure changes the setting of its sub-thermostat, say, from 85° to 75°. The constant interval (in the above example 10°) can be changed by adjustment of the sub-thermostat. Thus the master and sub-thermostat in combination accomplish the purpose of maintaining constant differential temperatures between the two media in which the two instruments are located by having the sub-thermostat control the temperature of one medium.

The thermostat 31 is a stop thermostat which functions through the sub-thermostat 33 when the sub-thermostat 33 is set lower than the stop-thermostat 31 and insures the maintenance of a minimum temperature in the room 1.

The thermostats 29, 31 and 33 are located in the recirculated room air duct 5 and hence are responsive to room air conditions; the master thermostat 32 is located in the fresh air inlet 22 and is therefore responsive to the temperature of the outside air and the sub-thermostat 30 is arranged in the eliminator plates 27 and hence is responsive to the temperature of the saturated air leaving the conditioner 24. The outlet of the stop-thermostat 31 is connected to the inlet of the sub-thermostat 33 by a line 34 and the setting of this sub-thermostat 33 is controlled by the pressure in a line 35 connected with the outlet of the master thermostat 32. The outlet of the master thermostat 29 is connected by a line 36 to the sub-thermostat 30 and controls its setting and the outlet of this sub-thermostat 30 is connected by a line 37 with a direct acting diaphragm valve 38 in the steam supply line 39 to the heater 23. This line 37 also connects with a reverse acting diaphragm valve 40 in the brine inlet line of a cooler or interchanger 41 which refrigerates the water withdrawn from the sump 42 of the conditioner and is pumped by a pump 43 through the spray water supply pipes 26 to provide the refrigerated sprays 25. The direct and reverse acting diaphragm valves 38 and 40 are, of course, so adjusted that they do not overlap in their action. It will also be understood that, if desired, for humidification, a heater could be placed in series with the cooler 41 and the steam supply to this heater controlled from the line 37 by a direct acting diaphragm valve.

In the form of the invention shown in Fig. 1, the outlet line 44 of the sub-thermostat 33 connects with a reverse acting diaphragm valve 45 in the inlet line 46 of the cooling coils 7 and thereby controls the admission of coolant to these coils. This outlet line 44 also connects with a direct acting diaphragm valve 47 in the steam supply line 48 of a heater 49 in the inlet 10 of the main fan 11. These reverse and direct acting diaphragm valves 45 and 47 are also so adjusted that they do not overlap in their action. The thermostat outlet line 44 also connects with the air motor 19 which controls the amount of air handled by the system. It is therefore apparent that the cooling and heating of the air and the amount of air handled is determined in response to the heat load in the room and also to maintain a temperature differential between the inside and outside air and at all times a definite minimum temperature in the room.

It is apparent that when the cooling medium admitted to the coils 7 is below the dew point of the room air passing through the passage 9, dehumidification of this air will take place. The amount of this dehumidification will depend upon the rapidity of flow of the cooling medium through the coils 7, this rapidity being under thermostatic control through the diaphragm valve 45. For example, the cooling medium entering the coils can be below the dew point of the room air but on leaving the coils is naturally above this dew point. By varying the rate of flow through the coils the total amount of the area of the coils which is below the dew point of the room air can be increased or decreased as desired. Thus, with the diaphragm valve 45 partly closed, only a small amount of cooling medium is admitted to the coils 7 and only a small part of the area of these coils is below the dew point of the room air and consequently only a small amount of dehumidification will take place. As the valve 45 is opened the area of the coils 7 which is below the dew point of the air will be increased and consequently a greater amount of dehumidification will be effected. On the other hand, it is apparent that only a part of the room air is lowered below its dew point, the balance being merely cooled. By this means a variable means is provided for achieving a controlled dehumidification of a part of the air passing through the coils and a mere cooling of the balance of this air.

The form of the invention shown in Fig. 2 shows the invention applied to a building having a plurality of rooms to be conditioned. This form is identical to the form shown in Fig. 1, except that the main heater 49 is eliminated and in its place in each of the mixed air inlets 13 to the rooms a heater 50 is arranged. Each of these heaters 50 is supplied with steam by a steam pipe 51 having a direct acting diaphragm valve 52 and this diaphragm valve is connected by a line 53 with a thermostat 54 so that when the temperature drops to a definite desired minimum, the thermostat 54 reduces the outlet pressure in the line 53 and operates the direct acting diaphragm valve 52 to admit steam to the heater 50 and heat the mixed air admitted to the room and thereby maintain this minimum temperature. It will be noted that in this form each room 1 has an individual heater 50 and thermostat 54 so that the minimum temperature in each room can be maintained as desired.

In Fig. 3 is shown an alternative form of means for regulating the amount of air handled by the fan 21 in response to the heat load in the room. In this form, the motor 19 actuates the contact arm 55 of a rheostat 56 in such manner that upon rising pressure in the sub-thermostat 33, outlet line 44, the contact arm 55 cuts resistance out and thereby increases the speed of the variable speed motor 57 which drives the fan 11. The fan is therefore actuated faster and delivers more air to the room or rooms 1. The rheostat 56 and variable speed motor for the fan 11 therefore substitute the dampers 15 and constant speed fan motor in the form of the invention shown in Figs. 1 and 2.

The form of the invention shown in Fig. 4 shows the manner in which the fresh air tempering heater 23 can be eliminated. Instead of this heater, dampers 58 are provided in an opening 59 between the recirculated room air duct 5 and the conditioner 24 and another set of dampers 60 are provided in the fresh air opening 22 to the conditioner. The two sets of dampers 58 and 60 are linked together to work in opposition to one another by bars 61 so that when the dampers 58 are moving from closed to open positions, the dampers 60 are moved from open to closed positions and vice versa. The dampers 58 and 60 are actuated by a damper motor 62 connected to the sub-thermostat 30, outlet line 37, in place of the direct acting diaphragm valve in the form shown in Figs. 1 and 2. This motor 62 has a piston rod 63 which connects with the intermediate part of a lever 64, this lever being pivoted at one end to one of the damper bars 61 and at its other end to a fixed support 65. A spring 66 is also employed to normally hold the free end of the lever 64 in a depressed position. It is therefore apparent that when the outside temperature drops to a predetermined minimum, the pressure in the outlet line 37 of the sub-thermostat 30 also drops, thereby acting on the motor 62 to permit this spring 66 to close the cold fresh air dampers 60 and open the recirculated warm room air dampers 58. This admits warm air to the spray chamber of the air conditioner in the same manner as the heater 23.

*Operation*

With the system organized as shown in Fig. 1, and with the fan 11 operating at a constant speed, fresh air is drawn through the fresh air inlet 22, past the heater 23, through the sprays 25 of the air conditioner 24, where it is cooled below its dew point, dehumidified and leaves the air conditioner saturated. Any entrained moisture is removed on passing through the eliminator plates 27 and the cold dehumidified saturated fresh air passes through the duct 28 to the mixing chamber 9.

The air in the room 1 is withdrawn through the outlet 4, duct 5 and then takes two paths, one through the by-pass 8 and the other through the cooling chamber 6 and cooling coils 7. The by-passed and the cooled recirculated room air mingles with the fresh air in the mixing chamber 9 and the mixed air is drawn through the heater 49 and either through the by-pass 16 or dampers 15 into the inlet of the fan 11. This fan delivers the mixed air so received through the duct 12 and outlet 13 to the room 1.

It is therefore apparent that at all times constant proportions of fresh and recirculated room air are handled by the system.

Assuming summer operation, when the temperature inside rises, the sub-thermostat 33, which is responsive to the room air temperatures, raises the pressure in its outlet line 44. Or if the outside air temperature rises, the master thermostat 32 responsive to this temperature increases the pressure on its outlet line 35 to adjust the setting of the sub-thermostat 33 and increases the pressure in its outlet line 44. In either case this increased pressure in the outlet line 44 holds the direct acting diaphragm valve 47 shut and prevents steam entering the heater 49. At the same time this rising pressure operates the motor 19 to open the dampers 15, and acts on the reverse acting diaphragm valve 45 to open it and admit more coolant to the cooling coils 7. The air going through the cooling chamber 6 is therefore cooled to a greater extent and as this air is mixed with the by-passed air and the fresh air, it lowers the temperature of the whole so that the air delivered to the room 1 is cooler. At the same time the rising pressure in the line 44 holds the direct acting diaphragm valve 47 shut so that no steam is admitted to the heater 49. At the same time the rising pressure in the line 44 admits pressure to the motor 19 so as to proportionally open the dampers 15. This opening of the dampers 15 decreases the resistance of the air flow so that with a rising temperature more air is admitted to the room 1, the proportions of fresh and recirculated room air always being the same, however.

The rising temperature of the room air also acts on the master thermostat 29 to admit more pressure to its outlet line 36 and this sets the sub-thermostat 30 to admit more pressure to its outlet line 37. The rising pressure in the sub-thermostat outlet line continues to hold the direct acting diaphragm valve closed so that the heater 23 is inoperative, and also opens the reverse acting valve 40 to admit more coolant to the cooler 41. This drops the temperature of the spray water forming the sprays 25 in the conditioner and since the temperature of the saturated air leaving the conditioner is dependent in part upon the temperature of the spray water, the lowering of the temperature of the spray water continues until the saturated temperature of the fresh air leaving the spray chamber reaches the temperature for which the sub-thermostat 30 is set to maintain. Since the amount of dehumidification or water taken out of the fresh air depends on the temperature of the saturated air leaving the spray chamber 24, it is apparent that as the temperature of the air in the room rises, the dehumidification of the fresh air is increased and that thereby the humidity in the room 1 is controlled.

When the outside temperature drops the master thermostat 32 reduces the pressure in its outlet line 35 and adjusts the setting of the sub-thermostat 33 to reduce the pressure in its outlet line 44. Or, if the room temperature drops, through the thermostat 33, the pressure in its outlet line 44 is reduced.

This reduction of pressure in the outlet line 44 closes the reverse acting diaphragm valve 45 proportionally and reduces the flow of coolant to the coils 7 thereby raising the temperature of the air delivered to the room. This continues until the flow of coolant to the coils 7 is completely cut off when the direct acting diaphragm valve 47 begins to open and admit steam to the heater 49. At the same time the reduced pressure supplied to the air motor 19 closes the dampers 15 until, when steam is turned into the heater 49, they are closed to their maximum extent and the minimum amount of recirculated room and fresh air is admitted to the room.

When the temperature of the room lowers to the minimum that is desired to be maintained, the sub-thermostat 33 is wide open. At this time the control of the heater 49 and the amount of air handled is taken over by the stop-thermostat 31 which acting through the inlet of the wide open sub-thermostat 33 operates the direct acting diaphragm valve 47 and the motor 19 to regulate the heating and amount of air handled. This stop thermostat 31 is set to maintain a minimum temperature in the room regardless of the differential between the inside and outside temperatures so that in winter time it is always comfortably warm inside.

At the same time the lowering temperature in the room, through the master thermostat 29 reduces the pressure in the outlet line 36 and adjusts the setting of the sub-thermostat 30 to reduce the pressure in the outlet line 37. The reduction in pressure in the outlet line 37, through the reverse acting diaphragm valve 40, gradually cuts off the flow of coolant to the cooler 41, raises the temperature of the spray water and the saturated temperature of the air leaving the spray chamber 24 and thereby reduces the dehumidification of the fresh air. When the flow of coolant to the cooler 41 is completely cut off (as in winter) the falling pressure in the line 37 opens the direct acting diaphragm valve 38 and admits heat to the heater 23 so as to heat the incoming fresh air. Since under these conditions the spray water is merely recirculated, it assumes the temperature of the heated fresh air so that the air leaves the spray chamber saturated at a higher wet bulb temperature than outside. In other words, the fresh air is humidified.

The combination of the master thermostat 29 and the sub-thermostat 30 serve to hold the relative humidity in the building well within the range of human comfort. This is true since the master thermostat 29, subject to the room temperature, controls the setting of the sub-thermostat 30, subject to the saturated temperature of the air leaving the conditioner. This assures that the dew point of the air leaving the conditioner will always be the required number of degrees below the room temperature thus assuring control of the relative humidity of the room. For example, assume that the master thermostat 29 and sub-thermostat 30 are set to maintain a saturated temperature of the air leaving the conditioner 20° below that of the room. When this saturated fresh air, together with the recirculated room air, assumes the temperature of the room (after being delivered to the room) the relative humidity in the room will be approximately 50% or well within the range of human comfort. By having the temperature of the room and the saturated temperature of the air leaving the conditioner walk up and down together in this manner, the relative humidity in the room can be maintained within very close limits without using any hygrostat control whatsoever.

Preferably in installations in buildings for the comfort of occupants the total volume of air handled is sufficient to do the greatest amount of required cooling when about 20% of the total volume is fresh air saturated at a temperature of about 20° below room temperature, about 40% of this total is recirculated room air at room temperature and the remaining 40% is recirculated air cooled about 15° below room temperature. Thus the average minimum temperature of the air delivered is not to exceed 10° below that of the room. This assures a dew point of the room air about 20° below room temperature giving about 50% relative humidity and yet the maximum average difference between the temperature of the room and the air supplied is never greater than 10° thus giving a relatively rapid air movement in the room without cold drafts as would occur were less air supplied at a greater differential in temperature.

Where several rooms are being conditioned, as shown in Fig. 2, it is sometimes desirable in the winter time to have the temperature to be maintained subject to independent control in each room. In such installations the heater 49 is eliminated and a heater 50 put in each air duct to each room. Each of these heaters is controlled by a direct acting diaphragm valve and thermostat 54 in each room so that in the winter time the temperature in each room can be varied to suit its individual requirements. In other respects this form of the invention is identical to that shown in Fig. 1.

It is obvious that instead of having the motor 19 control the amount of air handled by the dampers 15, this motor could control a rheostat which in turn controls a variable speed electric motor driving the fan. Such a construction is shown in Fig. 3, where, when in response to a falling room or outside temperature, the pressure in the sub thermostat outlet line 44 drops, the motor 19 operates a rheostat to cut resistance into circuit with the variable speed motor 57, reduce the speed of the fan and consequently reduce the amount of air it delivers to the room.

Instead of the tempering fresh air heater 23, warm recirculated air can be used for this purpose. Thus, as shown in Fig. 4, the falling pressure in the sub-thermostat outlet line 37 can operate a motor 62 to close a group of fresh air dampers 60 and open a pair of recirculated room air dampers between the fresh and recirculated air ducts 5 and 22.

From the foregoing description, it is apparent that all of the forms of the present invention provide a method and apparatus for conditioning buildings in which (1) by maintaining a constant desired differential in temperature between the room 1 or duct 5 and the dew point of the air leaving the conditioner 24, the relative humidity in the room 1 is properly controlled at all times, (2) during warm weather the temperature of the air in the room 1 is maintained a constant number of degrees below that outside until the desired minimum room temperature falls to, say, 70°, thus avoiding too cold an inside temperature as compared with that outside, (3) all fresh outside air delivered into the room is always thoroughly washed and cleansed of dust and dirt and is always dehumidified or humidified as required to maintain proper control for the greatest health and comfort of the occupants, (4) a saving of both steam and refrigerant is effected since both cannot be turned on simultaneously, (5) both steam and refrigerant are saved by controlling the total volume of air handled as the room gradually falls in temperature due to a reduction in the amount of heat to be absorbed in the room caused by a decrease in heat generation, (6) the total volume of air handled (both recirculated and fresh air) increases as the heat load thus insuring ventilation in proportion to the heat load in the room, (7) the total volume of air handled is always sufficient to maintain a proper air circulation through the room though only a small part of this is dehumidified fresh air, and at the same time the differential between the temperature of the air delivered and the air in the room is so small as not to cause uncomfortable cold drafts.

I claim as my invention:

1. In an apparatus for ventilating and conditioning the air in a room or the like, means for continuously withdrawing air from the room to be conditioned, an air conditioner, means for drawing an amount of fresh air through said air conditioner at all times proportional to said withdrawn room air, means for mixing said conditioned fresh air and said withdrawn room air and discharging said mixed air into said room, means responsive to the air conditions in said room for tempering a part of said withdrawn air, and means for varying the amount of mixed air delivered to the room in accordance with changes in the character of the air in the room.

2. In an apparatus for ventilating and conditioning the air in a room or the like, means for continuously withdrawing air from the room to be conditioned, an air conditioner, means for drawing an amount of fresh air through said air conditioner at all times proportional to said withdrawn room air, means for mixing said conditioned fresh air and said withdrawn room air and discharging said mixed air into said room, cooling means in the path of the air withdrawn from said room and before mixture with said conditioned fresh air, means responsive to the air conditions in said room and controlling the effect of said cooling means, and means for varying the amount of mixed air delivered to the room in accordance with changes in the character of the air in the room.

3. In an apparatus for ventilating and conditioning the air in a room or the like, means for continuously withdrawing air from the room to be conditioned, an air conditioner, means for drawing an amount of fresh air through said air conditioner at all times proportional to said withdrawn room air, means for mixing said conditioned fresh air and said withdrawn room air and discharging said mixed air into said room, cooling means in the path of the air withdrawn from said room and before mixture with said conditioned fresh air, means responsive to the temperature of the outside fresh air and to the heat load in said room and controlling the effect of said cooling means to maintain a substantially constant differential between the room temperature and the outside air temperature during relatively high ranges of said temperatures, and means for varying the amount of mixed air delivered to the room in accordance with changes in the character of the air in the room.

4. In an apparatus for ventilating and conditioning the air in a room or the like, means for continuously withdrawing air from the room to be conditioned, an air conditioner, means for drawing an amount of fresh air through said air conditioner at all times proportional to said withdrawn room air, means for mixing said conditioned fresh air and said withdrawn room air and discharging said mixed air into said room, cooling means in the path of the air withdrawn from said room and before mixture with said conditioned fresh air, means responsive to the temperature of the outside fresh air and to the heat load in said room and controlling the effect of said cooling means to maintain a substantially constant differential between the room temperature and the outside air temperature during relatively high ranges of said temperatures comprising a sub-thermostat responsive to the temperature of the air in said room and controlling the effect of said cooling means and a master thermostat responsive to outside air temperatures and controlling the setting of said sub-thermostat, and means for varying the amount of mixed air delivered to the room in accordance with changes in the character of the air in the room.

5. In an apparatus for ventilating and conditioning the air in a room or the like, means for continuously withdrawing air from the room to be conditioned, an air conditioner, means for drawing an amount of fresh air through said air conditioner at all times proportional to said withdrawn room air, means for mixing said conditioned fresh air and said withdrawn room air and discharging said mixed air into said room, cooling means in the path of the air withdrawn from said room before mixture with said conditioned fresh air, means for by-passing a part of said air withdrawn from said room around said cooling means, means controlling the effect of said cooling means in response to air conditions in said room, and means for varying the amount of mixed air delivered to the room in accordance with changes in the character of the air in the room.

6. In an apparatus for ventilating and conditioning the air in a room or the like, means for continuously withdrawing air from the room to be conditioned, an air conditioner, means for drawing an amount of fresh air through said air conditioner at all times proportional to said withdrawn room air, means for mixing said conditioned fresh air and said withdrawn room air and discharging said mixed air into said room, cooling means in the path of the air withdrawn from said room and before mixture with said conditioned fresh air, means responsive to the air conditions in said room and controlling the effect of said cooling means at relatively high room temperatures, means for heating said mixed air, means responsive to the air conditions in said room and controlling the effect of said heating means at relatively low room temperatures, and means for varying the amount of mixed air delivered to the room in accordance with changes in the character of the air in the room.

7. In an apparatus for ventilating and conditioning the air in a room or the like, a fan, means connecting the inlet of the fan with a mixing chamber, a duct connecting said mixing chamber with the room to be conditioned, a duct connecting the mixing chamber with a source of fresh air, means for conditioning the fresh air, a duct connecting the outlet of the fan with said room, a movable restriction in the path of said mixed air from the mixing chamber to the room and means for moving said restriction to vary the amount of mixed air delivered in accordance with the differential between the temperature of the fresh air and the air in said room.

CLAUDE A. BULKELEY.